United States Patent [19]

Billian

[11] Patent Number: 4,914,625
[45] Date of Patent: Apr. 3, 1990

[54] BYPASS MECHANISM FOR DAISY CHAIN CONNECTED UNITS

[75] Inventor: Auguste F. J. Billian, Vence, France

[73] Assignee: International Business Machines Corporation, Armonk, N.Y.

[21] Appl. No.: 423,737

[22] Filed: Oct. 16, 1989

Related U.S. Application Data

[63] Continuation of Ser. No. 129,126, Dec. 4, 1987, abandoned.

[30] Foreign Application Priority Data

Dec. 16, 1986 [EP] European Pat. Off. ........ 86430052.0

[51] Int. Cl.⁴ ...................... G06F 13/38; G06F 11/00
[52] U.S. Cl. ................................. 364/900; 364/935.2; 364/941.91; 364/944.2; 364/949.4; 371/11.2; 340/825.01; 340/825.05; 370/16
[58] Field of Search ... 364/200 MS File, 900 MS File; 371/11.1, 11.2, 22.1; 370/16; 340/825.01, 825.03, 825.05, 825.02

[56] References Cited

U.S. PATENT DOCUMENTS

| | | | |
|---|---|---|---|
| 3,806,885 | 4/1974 | Moore | 364/200 |
| 3,970,993 | 7/1976 | Finnila | 364/200 |
| 4,159,470 | 6/1979 | Strojny et al. | 371/11 X |
| 4,271,511 | 6/1981 | Manber et al. | 340/825.01 |
| 4,354,267 | 10/1982 | Mori et al. | 371/11 |
| 4,380,052 | 4/1983 | Shima | 364/900 |
| 4,415,973 | 11/1983 | Evans | 364/200 |
| 4,561,088 | 12/1985 | Champlin et al. | 370/16 |
| 4,567,482 | 1/1986 | Dolsen et al. | 340/825.05 |
| 4,584,677 | 4/1986 | Kosaka | 370/15 |
| 4,596,982 | 6/1986 | Bahr et al. | 340/825.05 |
| 4,623,884 | 11/1986 | Ihara et al. | 340/825.05 |
| 4,723,241 | 2/1988 | Grobel et al. | 371/11 |
| 4,833,605 | 5/1989 | Terada et al. | 364/200 |

FOREIGN PATENT DOCUMENTS 2088598 9/1982 United Kingdom .

OTHER PUBLICATIONS

Toshino Kondo et al., "An LSI Adaptive Array Processor", IEEE Journal of Solid-State Circuit, vol. SC-18, No. 2, Apr., 1983, pp. 147-155.

Primary Examiner—Thomas C. Lee
Attorney, Agent, or Firm—Edward H. Duffield

[57] ABSTRACT

A bypass mechanism is described for improving the operation of a daisy chain line linking a plurality of units and used for propagating a signal which may be trapped by the first unit in the chain having a pending service request to be serviced by a common resource 12. The daisy chain line is connected to each units through an input line and the signal to be propaagated, if not trapped by the unit is sent to the next unit through an output line.

All units in the chain are connected to a bypass line. A plurality of bypass lines may be provided when a plurality of sets of consecutive units should be able to be disconnected from the chain. When it is desired to disconnect consecutive units from the chain, gating logic in the unit preceding the first unit to be disconnected causes the signal to be propagated to be provided to a bypass out line and, in the unit following the last unit to be disconnected, the signal taken from bypass in line signals which are sent to the units through bus 14.

4 Claims, 4 Drawing Sheets

| FIG. 1A | FIG. 1B |

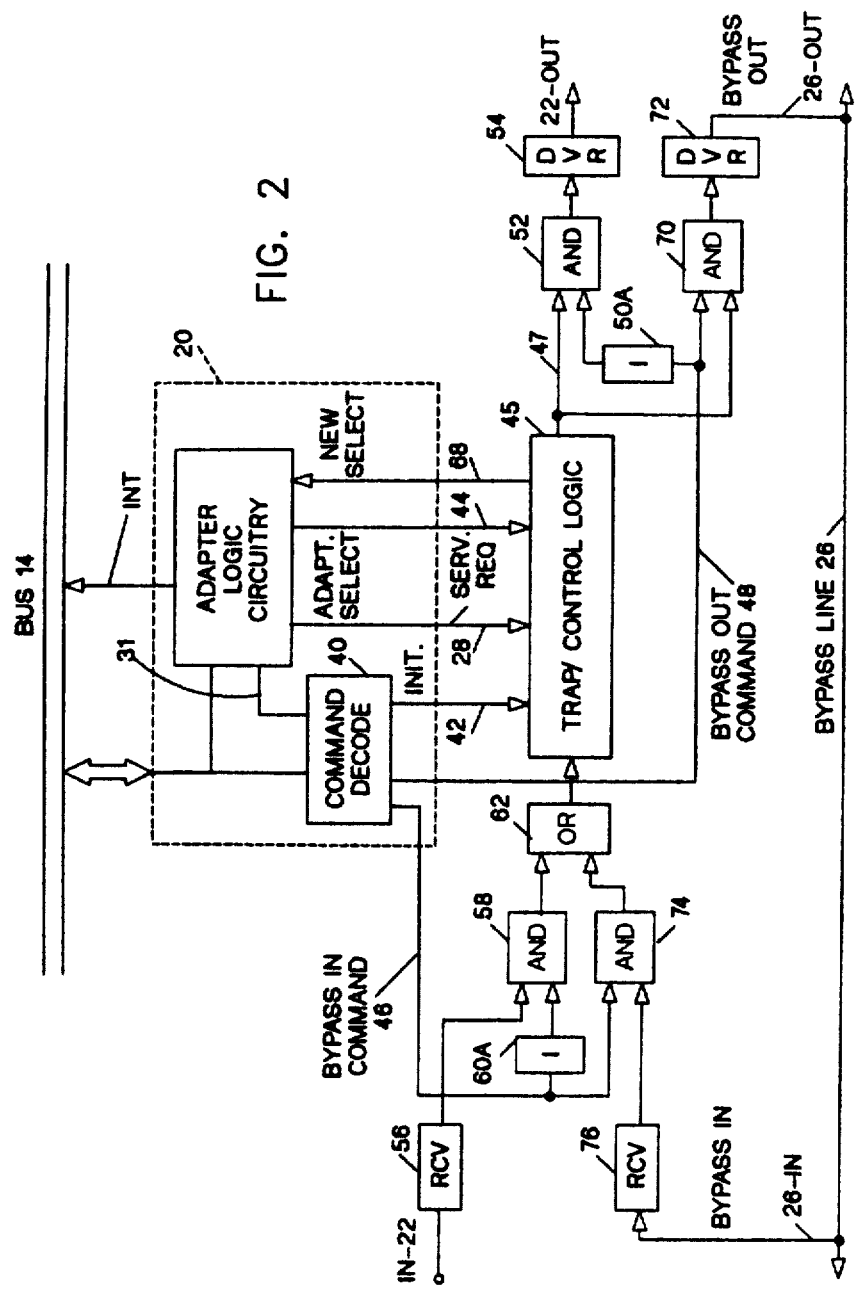

BYPASS MECHANISM FOR DAISY CHAIN CONNECTED UNITS

This application is a continuation of application Ser. No. 129,126 filed Dec. 4, 1987, now abandoned.

FIELD OF THE INVENTION

This invention relates to communication systems in general and to data communications in particular. This invention is a bypass mechanism of preventing interruption of the continuity of a daisy chain when the units connected to this chain become inoperative.

BACKGROUND OF THE INVENTION

The "daisy chain" type of connection for a plurality of units working under control of a central controlling unit constitute a conventional configuration and method of operation for selecting a unit in the chain for reception, control or transmission of data.

For example, a communication controller which processes the data to and from communication lines comprises a central control unit and several types of adapters such as line adapters, channel adapters, etc. A network control program such as IBM NCP runs in the central control unit and controls the operation of the adapters through either program-initiated operation or adapter-initiated operations. The adapters of each given type, for example channel adapters are connected through a common line in a daisy chain configuration and mode of operation.

The adapters communicate with the central control unit through interrupts. The central control unit services the interrupts raised by the adapters. The selection of each adapter may be done either by the control program through a specific command or by an autoselection mechanism involving hardware. The autoselecton mechanism is started on a broadcast command to the adapters. On this command, the adapters use the daisy chain line to perform the selection of any connected adapter having an interrupt pending.

In such an environment, if an adapter is failing or has to be disconnected from the daisy chain, the daisy chain operation is interrupted.

U.S. Pat. No. 4 380 052 describes a mechanism which allows such a problem to be solved.

According to this patent, each unit Pn, if said unit is not to be selected and has not received the signal to be propagated within a fixed time duration, comprises an alert circuit which is responsive to the arrival of a signal to be propagated in the chain, to the preceding unit P(n−1) to cause a signal to be restarted to the next unit P(n+1).

* This mechanism presents the following drawbacks:

It does not operate if more than one unit are failing and have to be bypassed, because when two or three units in series are failing the signal from the previous unit is no longer received.

Furthermore, if a failing unit self-restarts its operation, there may be two signals which are propagated in the chain.

OBJECTS OF THE INVENTION

An object of the present invention is to provide an improved mechanism which allows at least one unit connected to a common line in a daisy chain mode of operation to be bypassed or to be disconnected when said unit(s) is (are) failing.

SUMMARY OF THE INVENTION

The improved bypass mechanism of the present invention improves the operation of a daisy chain line linking a plurality of units used for propagating a signal. The signal may be trapped by the first unit in the chain having a pending service request to be serviced by a common resource. The daisy chain line is connected to the units through input receiver means (56). The signal to be propagated, if not trapped by the unit, is sent through output driver means (54) to the next unit in the chain. The mechanism includes the following elements:

In and out bypass line means (26-1, 26-2) to which all units are attached, control and logic means (16,12,20) for identifying the (at least one) unit, if any, which must be disconnected from the daisy chain, and for sending a "bypass out" control signal to the unit preceding each identified unit or unit(s) and for sending a "bypass in" control signal to the unit following each identified unit or set of unit(s), first bypass control logic means (50,70, 70-1,70-2) located in each unit, which means are responsive to the "bypass out" control signal for causing the signal to be propagated to be sent to the bypass line means, second bypass control logic means (60,74,74-1,74-2) located in each unit and responsive to the "bypass in" control signal for causing the signal propagated along the chain to be received from the bypass line means. This allows the bypass of each unit or set of unit(s) by disconnection from the chain.

BRIEF DESCRIPTION OF THE DRAWINGS

FIG. 2 shows in more detail the gating control circuit 24 of FIG. 1.

DETAILED DESCRIPTION OF THE INVENTION

Figures 1, 1A:
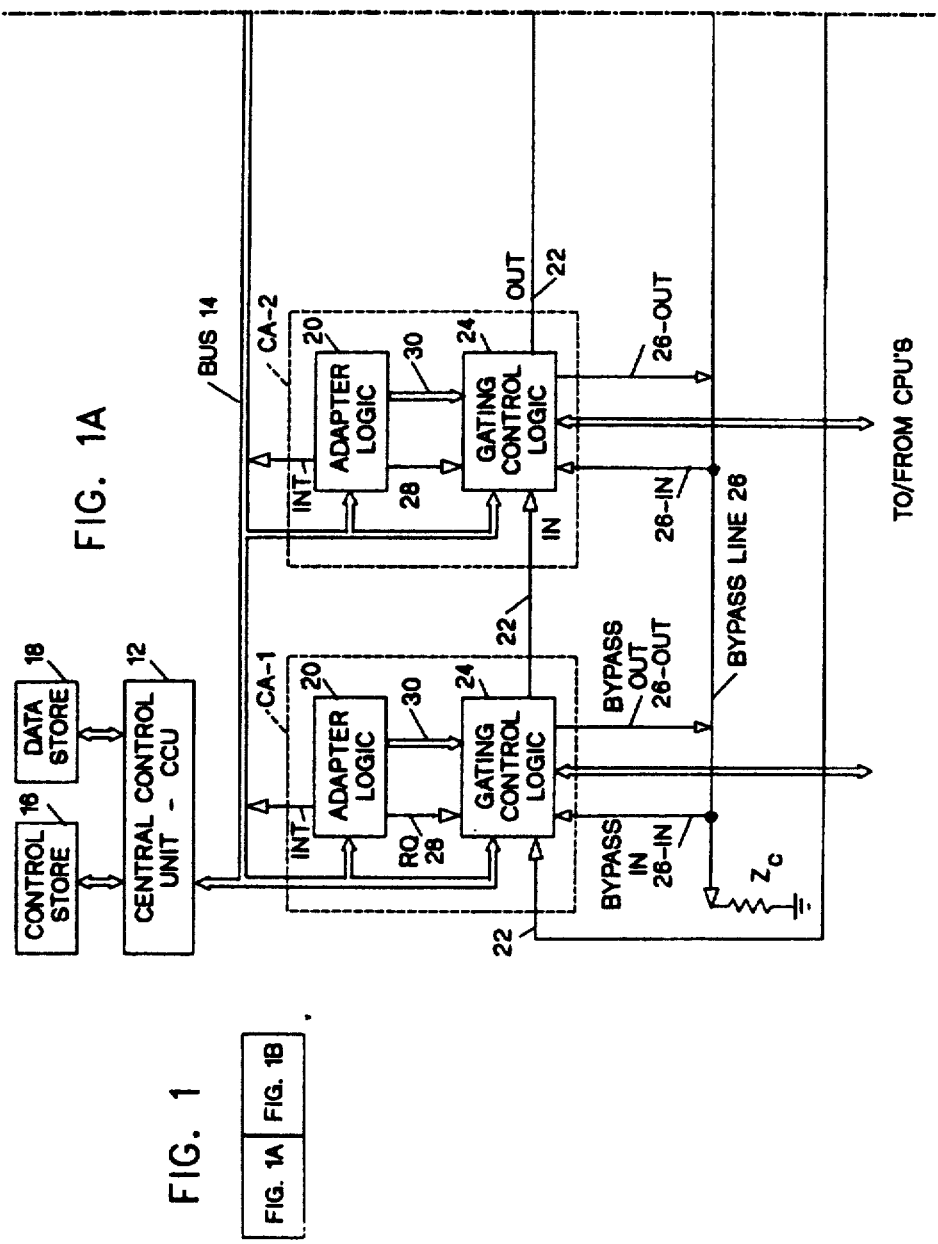
FIG. 1, consisting of FIGS. 1A and 1B, show the block diagram of a portion of a communication controller comprising a preferred embodiment of the mechanism of the present invention.
Figure 1B:
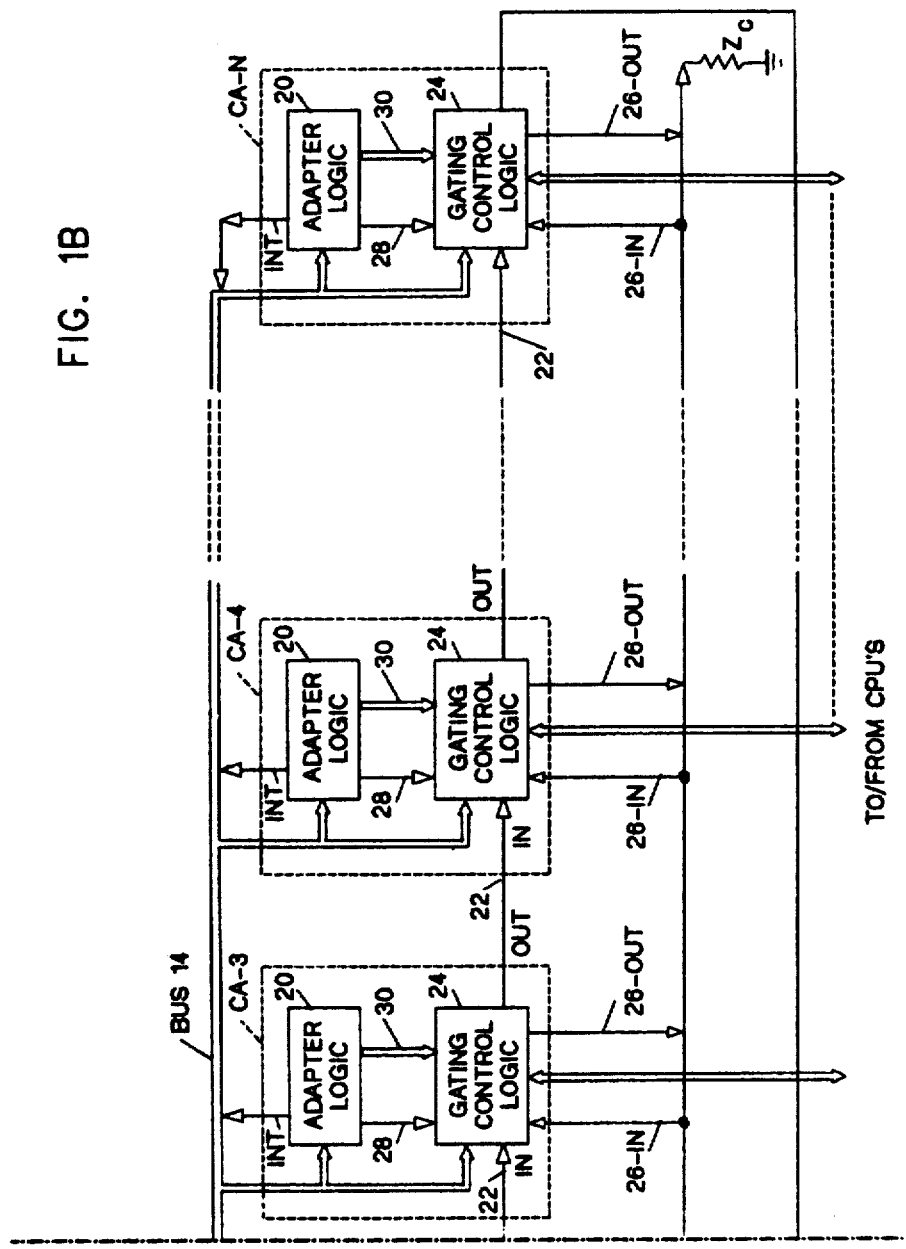

The detailed description of the invention herein assumes, for example, that the "units" connected to the daisy chain line are the channel adapters of a communication controller.

The channel adapters CA-1 to CA-n are connected to the central control unit CCU 12 through bus 14. The central control unit 12, under control of programs in control store 16, controls the transfer of data from data store 18 to attached central processing units CPUs (not shown) through channel adapters CA-1 through CA-n.

The adapters comprise conventional adapter logic circuitry 20 which contains buffer registers, address recognition circuits and sufficient control circuits working under the control of the central control unit to supervise the data transfers. This logic circuitry will not be described in detail since it is not involved in the operation of the mechanism according to the present invention. As an example this circuitry may be similar to the circuitry which is implemented in the IBM 3705 or 3725 Communication Controllers.

The adapters are connected through a daisy chain line 22. This provides a chance for avoiding the loss of information to each adapter to be serviced.

The adapters communicate with the central control unit through CCU interrupts which are processed by the CCU at a given level of the programs which is runs. The adapters raise an interrupt by activating the INT line of bus 14. When the CCU services the interrupts, a process of priority selection in the daisy chain connection allows one of these adpaters to be selected and to remain selected until it completes its task. Then another selection can be made.

The present invention does not relate to the priority processing, per se, butit relates to a bypass mechanism which is implemented in gating control logic 24 and makes use of a bidirectional bypass line 26. This mechanism is used when one or several adapters are failing or are to be disconnected from the chain.

At the control program's initialization time, one adapter, for example adapter CA-2, is selected by the program running in the central control unit to service an interrupt presented to CCU 12.

The program in CCU 12 issues a broadcast command on bus 14 which is decoded as a service request by every adapter. The selected example adapter CA-2, upon decoding of this command activates its "daisy chain out" line 22 at output 22-OUT of its gating control logic 24. The service request signal is also provided on line 28 to logic 24.

The next adapter in the chain, adapter 3, has its input 22-IN activated by the output 22-OUT of the preceding adapter 2. If a service request is pending in this adapter CA-3, circuit 24 traps the "IN" signal on line 22 and does not activate the output 22-OUT. Adapter CA-3 completes the execution of the command and becomes the selected adapter. The control program issues several commands to the selected adapter CA-3 to process the control program's request. At the completion of the task, the control program resets the interrupt line in the selected adapter.

On the next broadcast command, the same operations are performed. This is the normal way of operation in daisy chained adapters.

If for any reason such as power down, internal error, broken cable, etc. . . . one adapter is no longer able to complete its task or to propagate the signal on the daisy chain line, all adapters downstream in the chain are no longer able to operate.

The improved adapter of this invention comprises several checkers to verify the proper operation of the daisy chain. Any error is reported to the control program. The error processing routing identifies the failing adapter by issuing a "read sense" command to the adapters. The adapters which have detected an error answer the command with the sense data and their addresses. The failing adapters have to be removed from the daisy chain line.

It will be assumed for the sake of explanation, that adapter CA-4 is the failing adapter in the chain.

The program issues an "output bypass" command on bus 14 to adapter CA-3 preceding the failing adapter in the chain. This causes circuit 24 to activate the "bypass OUT" line 26. The program also issues an "input bypass" command on bus 14 to adapter CA-5 following the failing adapter which causes the functional input line IN-22 of the daisy chain to be ignored and replaced by the "bypass IN" line 26 in circuit 24.

In this way, adapter CA-4 is bypassed and does not effect the operation of the chain, even if its line 22-OUT is active. Adapter CA-5 monitors the bypass signal and drives its line 22-OUT if no service request is pending in it. Control lines 30 from adapter logic circuitry 20 are activated to cause the bypass commands issued on bus 14 to be provided to circuit 24 of the adapters which have to drive or monitor the bypass line.

The bypass line 26 is a bidirectional line and is driven by one and only one adapter, namely the one preceding the failing adapter. This output is taken as input only in one adapter, namely the one following the failing adapter.

The bypass line 26 is loaded at both ends by its characteristic impedance Zc, which facilitates the transmission of the bypass signal on the bypass line.

In case adapter CA-n, i.e. the last adapter in the chain is failing, adapter (n-1) drives its "bypass out" line and adapter 1 monitors the "bypass in" line instead of input line IN-22 of the functional daisy chain.

A plurality of consecutive adapters may be bypassed by addressing the "bypass out" command to the adapter preceding the first failing adapter in the chain and by addressing the "bypass in" command to the adapter following the last failing adapter.

If more than one disconnection of consecutive adapters is desired, a number of bypass lines equal to the desired number of disconnections is to be provided.

As will now be described with reference to FIG. 2, a logic arrangement may be used to perform the bypass function in circuit 24.

In FIG. 2, the same references as in FIG. 1 are used to designate the same components.

Adapter logic circuitry 20 comprises a command decoding circuit 40 which is activated by a signal on control line 31 when the central control unit sends a command through bus 14 to the selected adapter.

Circuit 40 decodes the commands and generates therefrom an active signal on BYPASS IN COMMAND line 46 or BYPASS OUT COMMAND line 48, as the case may be, or on the initialization line 42 to start the selection mechanism.

Signal on initialization line 42 is active when the central control unit issues a broadcast command on bus 14 to start a selection operation. Line 42 is provided together with the ADAPT SELECT signal on line 44 to the trap and control logic 45. In the selected adapter logic 45 activates its output line 47.

In normal mode of operation, (no failing adapter), BYPASS OUT COMMAND line 48 is inactive. The signal on line 48 is inverted in inverter 50, the output signal of which conditions AND gate 52 and driver 54 to activate the daisy chain line through output 22-OUT.

The next adapter in the daisy chain thus gets its line IN-22 active. The signal is applied to AND gate 58 through receiver 56. The BYPASS IN COMMAND line 46 is not active, thus inverter 60-a provides an active signal which conditions AND gate 58. Thus AND gate 58 transmits to OR gate 62, the incoming signal on line 22 to trap and control logic 45.

If the service request line 28 is inactive, trap and control logic 45 activates line 47 so that AND gate 52, which is conditioned since the BYPASS COMMAND OUT line 48 in this adapter is inactive, propagates the signal through line 22-OUT to the next adapter.

If the service request line 28 is active, trap and control logic 45 does not activate output line 47, but activates the NEW SELECT line 68 to the adapter logic circuitry 20. Adapter 20 completes the sequence on bus 14.

The BYPASS OUT mode is set in the adapter preceeding the failing ones in the daisy chain. Upon detection of a BYPASS OUT COMMAND in command decode circuit 40, line 48 is activated. Thus AND gate 52 is not conditioned and AND gate 70 is conditioned. The signal on line 47 coming out of the trap and control logic 45 is propagated through driver 72 on bypass OUT line, 26-OUT.

The BYPASS IN mode is set in the first adapter which follows the last failing adapter in the daisy chain. In this adapter the command decode circuit 40 upon detection of a BYPASS IN command, activates line 46. Inverter 60-a provides an inactive signal which prevents the IN signal received from 22 by receiver 56 from being propagated to trap and control logic 45 by AND gate 58. AND gate 74 has one input connected to the output of receiver 76 which monitors the bypass IN line 26-IN and is conditioned by the active signal on line 46. The output of AND gate 74 is provided to OR gate 62, the output of which is connected to trap and control logic circuit 45.

The logic shown in FIG. 2 allows one or several adapters in series to be bypassed, since the bidirectional bypass line may only be driven by one adapter (the one preceding the first failing adapter) and may only be monitored by one adapter (the one following the last failing adapter). In order to have two or more series of adapters bypassed, a corresponding number of bypass lines have to be provided.

Figure 3:
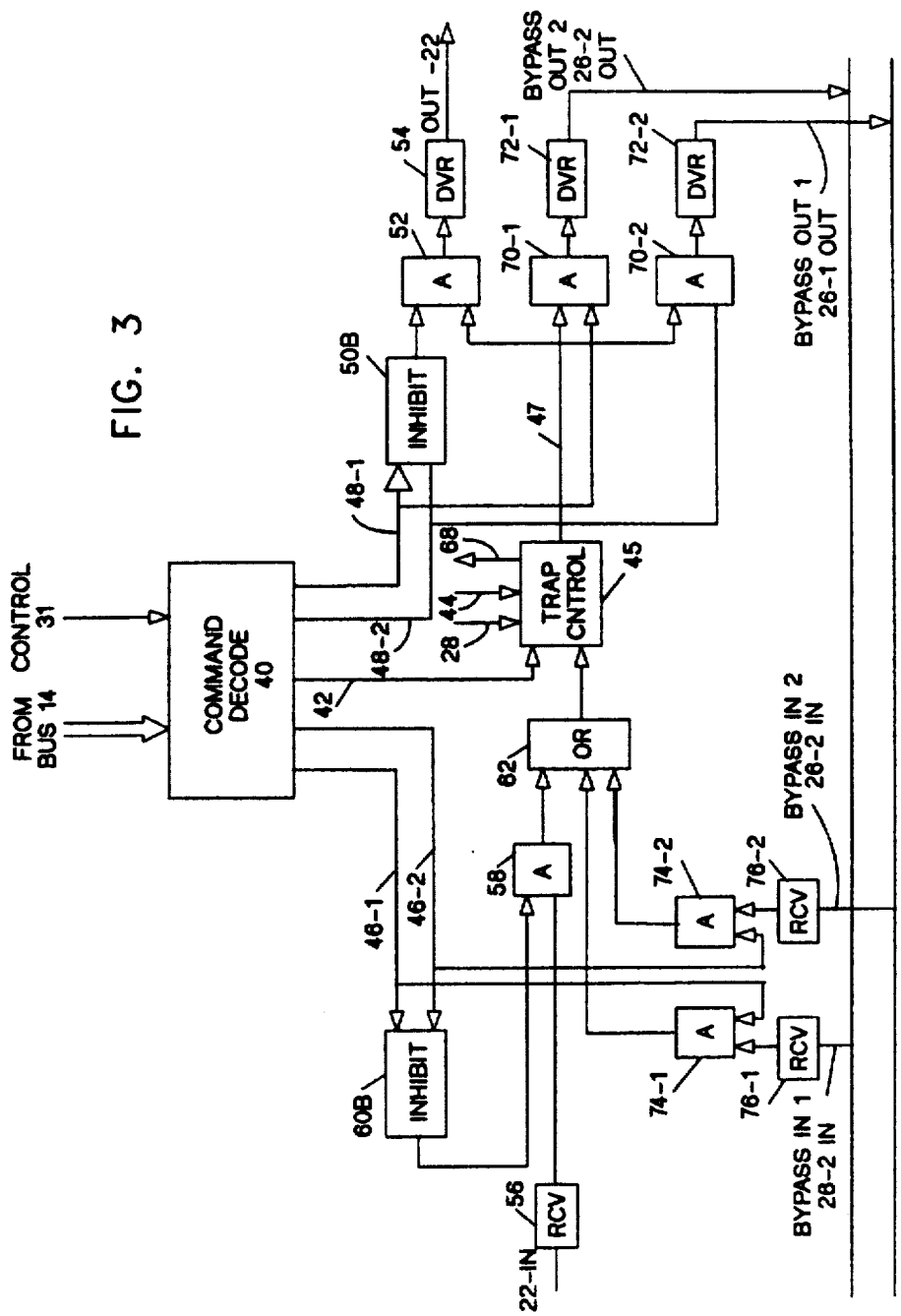
FIG. 3 shows the gating control circuit to be used when two bypass lines are provided.

FIG. 3 shows how the circuit of FIG. 2 has to be modified when two bypass lines 26-1 and 26-2 are provided. The same reference as in FIG. 2 are used, a suffixes 1 or 2 being added to the components which have to be duplicated to drive and monitor the bypass lines 26-1 and 26-2. These components are gates 70 and 74 and bypass command lines 46 and 48. Inverters 50-a and 60-a are replaced by an inhibit circuits 50-b, 60-b which prevent gates 52 and 58 from being conditioned when bypass command lines 46-1, 46-2 and 48-1, 48-2 are active.

I claim:

1. A bypass mechanism for improving operation of a daisy chain line linking a plurality of units and used for propagating a signal which may be trapped by a first unit in the chain having a pending service request to be serviced by a common resource, said daisy chain line being connected to the units through input means (56) and the signal to be propagated, if not trapped by the unit, being sent through output means (54) to a next unit in the chain, said mechanism allowing a desired maximum number x of distinct not contiguous sets comprising a variable number of contiguous units to be disconnected from the chain, and being characterized in that it comprises:

x bidirectional lines (26) to which all units are attached, each unit having the capability to conditionally receive the signal to be propagated from said bidirectional lines and to conditionally provide the signal to be propagated to said bidirectional lines, control logic means (16, 12, 20) for identifying the sets of units, if any, which have to be disconnected from the daisy chain and sending bypass out control signals to the units preceding a first unit in each identified set and bypass in control signals to the units following a last unit in each identified set, said bypass out control signals and bypass in control signals being indicative of selected lines among the x bidirectional lines to be used for bypassing each identified set of units, first bypass control means (50, 70-1, 70-2) located in each unit and which are responsive to the bypass out control signal received from the control logic means to cause the signal to be propagated to be sent to the selected bidirectional line as indicated by the received bypass out control signal, second bypass control means (60,74-1, 74-2) located in each unit and responsive to the bypass control in signal received from the control logic means to cause the signal to be propagated along the chain to be received from the selected bidirectional line as indicated by the received bypass in control signal so as to bypass each set of units by means of a selected bidirectional line.

2. A bypass mechanism according to claim 1, characterized in that the bidirectional lines are terminated by their characteristic impedances.

3. A bypass mechanism according to claim 1, characterized in that the first bypass control means comprise:

inhibiting means (50, 52) which are responsive to the bypass out control signals to prevent the signal to be propagated in the chain from being transmitted on the chain by the output means (54) when at least one of the said bypass out signals is active, x gating means (70), each one being responsive to a bypass out control signal to cause the signal to be propagated to be provided to the selected bidirectional line, as indicated by the bypass out control signal when said bypass out control signal is active.

4. A mechanism according to claim 1 or 2 or 3, characterized in that the second bypass control means comprises:

inhibiting means (60) which are responsive to the bypass in control signals to prevent the signal received by the input means (56) from being trapped or propagated by the unit when at least one of said bypass in control signals is active, x gating means (74), each one being responsive to a bypass in control signal to cause the signal from the selected bidirectional line as indicated by the bypass in control signal to be trapped or propagated by the unit when said bypass in signal is active.

* * * * *